(12) United States Patent
Prokopchuk

(10) Patent No.: US 7,648,629 B2
(45) Date of Patent: Jan. 19, 2010

(54) PORTABLE WATER FILTRATION DEVICE

(76) Inventor: Alaina Carole Prokopchuk, 78 The Bridle Path, Winnipeg, MB (CA) R3R 3B5

( * ) Notice: Subject to any disclaimer, the term of this patent is extended or adjusted under 35 U.S.C. 154(b) by 30 days.

(21) Appl. No.: 12/025,396

(22) Filed: Feb. 4, 2008

(65) Prior Publication Data
US 2008/0237105 A1 Oct. 2, 2008

Related U.S. Application Data

(60) Provisional application No. 60/896,952, filed on Mar. 26, 2007.

(51) Int. Cl.
*B01D 35/05* (2006.01)

(52) U.S. Cl. .............................. 210/170.05; 210/170.09; 210/242.1; 210/257.1; 405/127

(58) Field of Classification Search ................. 210/104, 210/122, 170.05, 170.09, 170.11, 257.1, 210/416.1; 405/127
See application file for complete search history.

(56) References Cited

U.S. PATENT DOCUMENTS

| | | | | |
|---|---|---|---|---|
| 1,909,578 A * | 5/1933 | Franke | ..................... | 210/242.1 |
| 3,402,817 A * | 9/1968 | Dovel | ...................... | 210/242.1 |
| 3,722,686 A * | 3/1973 | Arnett et al. | ........... | 210/170.09 |
| 4,231,873 A * | 11/1980 | Swigger | ................ | 210/170.05 |
| 4,582,609 A * | 4/1986 | Hunter et al. | ......... | 210/170.05 |
| 4,900,432 A * | 2/1990 | Arnold et al. | ............ | 210/242.1 |
| 5,052,855 A * | 10/1991 | Chapman et al. | ............ | 405/127 |
| 5,660,725 A * | 8/1997 | Klass | ......................... | 210/122 |
| 6,076,994 A * | 6/2000 | Brockway et al. | ........... | 405/127 |
| 6,251,266 B1 * | 6/2001 | Gannon et al. | ......... | 210/170.05 |
| 6,432,304 B1 * | 8/2002 | Nguyen | .................. | 210/242.1 |
| 2003/0085166 A1 * | 5/2003 | Dreyer et al. | ............ | 210/242.1 |

* cited by examiner

*Primary Examiner*—Christopher Upton
(74) *Attorney, Agent, or Firm*—Ryan W. Dupuis; Ade & Company Inc.

(57) ABSTRACT

A portable filtration device filters water from a body of water within which the device can be buoyantly supported. The device generally comprises an inflatable floatation chamber arranged to support the device to float on the body of water and a filtration housing arranged to be suspended from the floating chamber in the body of water. The filtration housing has an inlet, an outlet, and a filtration medium arranged to filter water passing therethrough from the inlet to the outlet. The inlet is arranged for communication with the body of water and the outlet is arranged for communication with a filtered water reservoir for providing potable water to the reservoir.

17 Claims, 6 Drawing Sheets

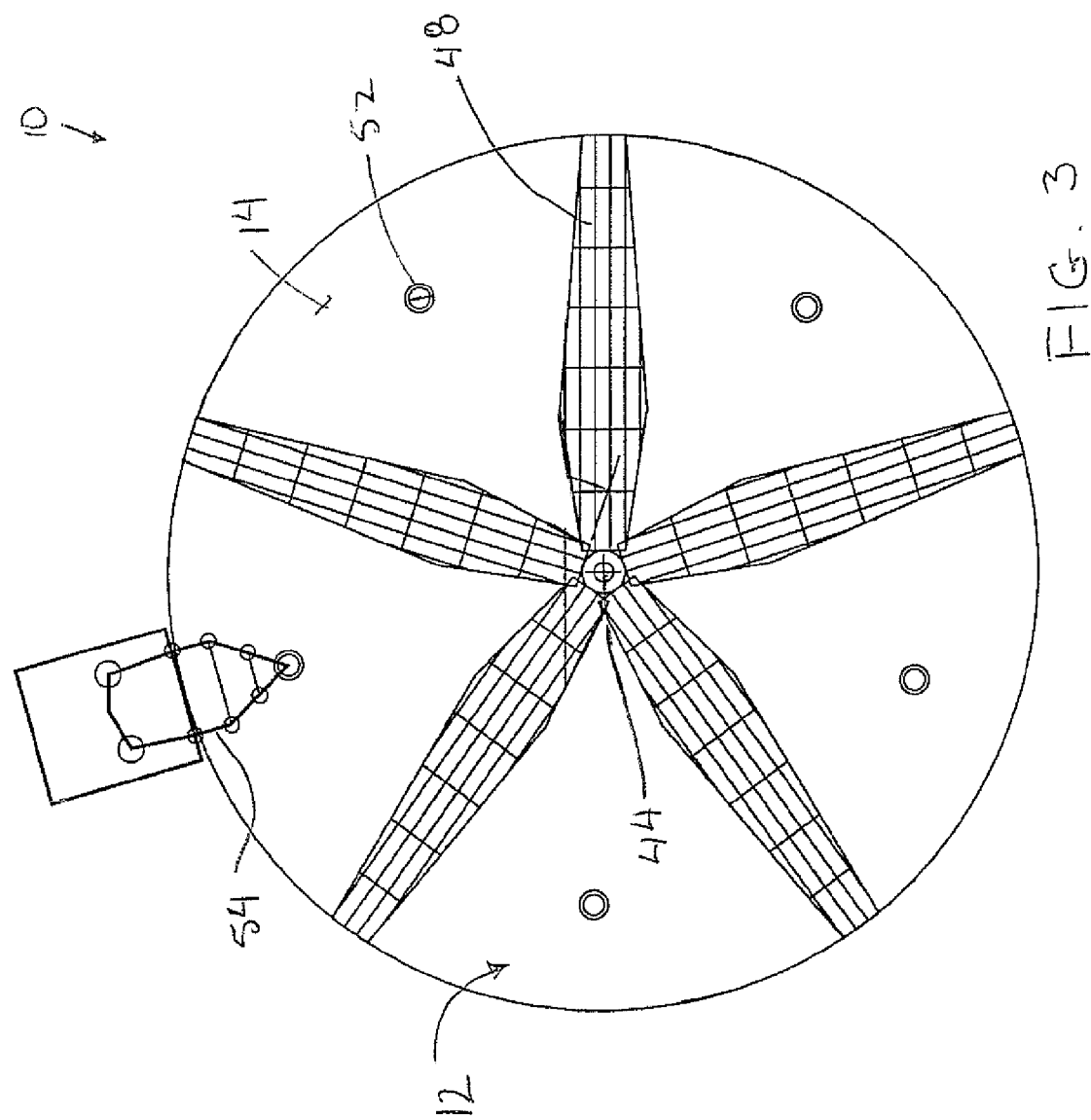

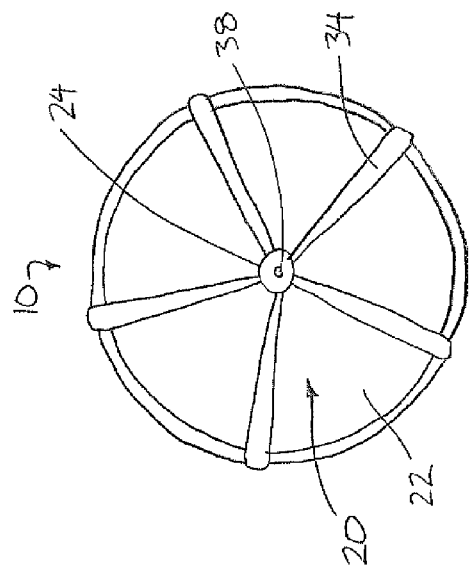
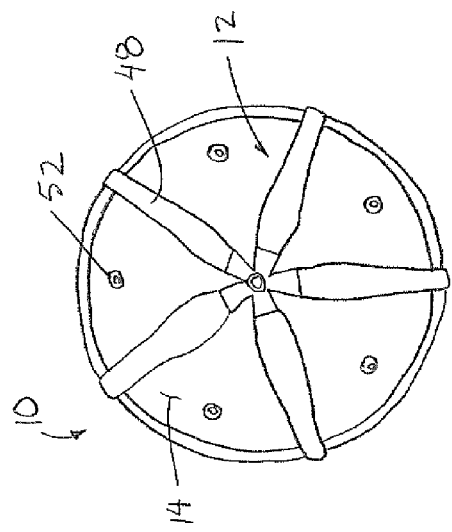
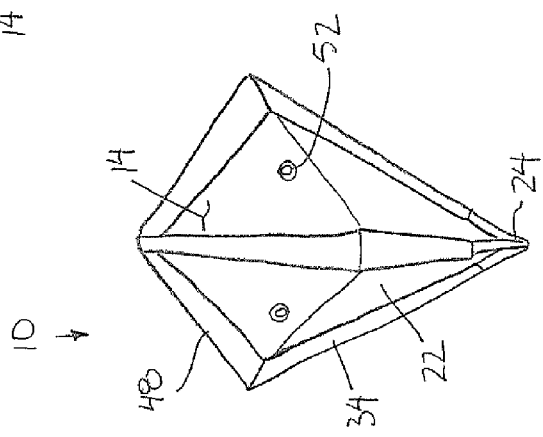
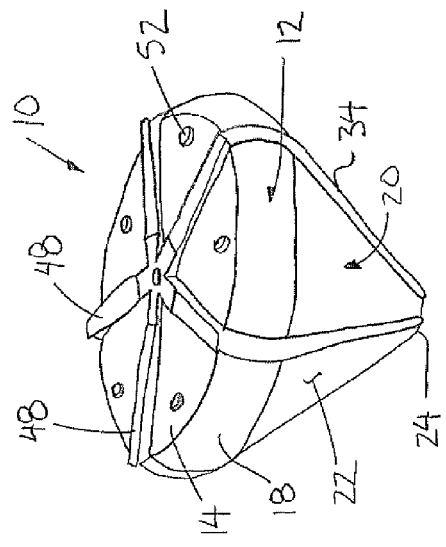
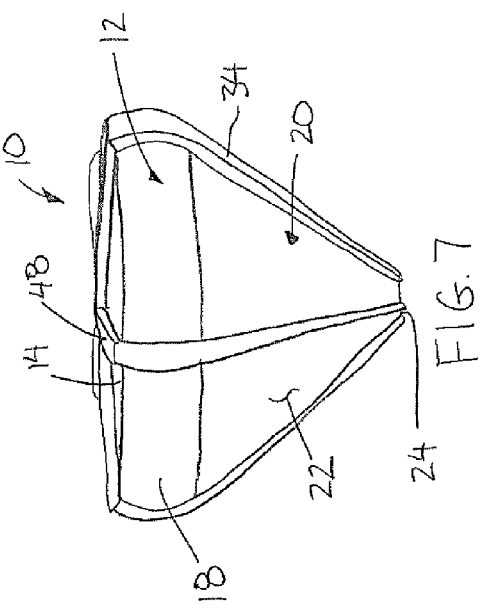

PORTABLE WATER FILTRATION DEVICE

This application claims the benefit under 35 U.S.C. 119(e) of U.S. provisional application Ser. No. 60/896,952, filed Mar. 26, 2007.

FIELD OF THE INVENTION

The present invention relates to a filtration device for water which is readily portable, and more particularly relates to a filtration device which is arranged to be self-supporting floatably in a body of water.

BACKGROUND

The national and international water crisis, the unavailability of clean and safe drinking water in times of disaster as well as in everyday scenarios on smaller local scales in nations in all stages of development are an ongoing problem, for example in the applications of Recreational waterways; Livestock; Algae blooms (lake application); and Disaster mitigation, both developed and developing nations.

In times of crisis such as a flood, where there is ample water, albeit undrinkable, relief organizations have the continuous, cumbersome task of delivering millions of bottles of water, which is the number one need in all disasters.

SUMMARY OF THE INVENTION

The device according to the present invention, referred to herein as sWell, is a portable filtration unit that can be quickly deployed in place of bottled water, as it has the ability to rapidly filter flood, or grey water into potable water. It can also provide a safety raft when habitants are inundated with water. Swell maximizes a readily available resource like flood water, rather than relying on the continual dispersal of outside supplies. It is a self sufficient unit that would function for the duration of the crisis as well as in the aftermath, thus alleviating some of the vast relief efforts. The product is specific in addressing water quality issues as well as alternative forms of energy in providing sustainable solutions for disaster preparedness, mitigation and temporal infrastructure. The underlying concept is based on biomimicry, or the use of 'natural' or biological systems to help inform design decisions, attempting to reveal the intrinsic relationship among design, imaginative perspective, and science.

Based on its universality, its current and imminent necessity, the production and manufacturing of sWell becomes a lucrative investment for the private investor, international relief organizations like the Red Cross, or governmental departments such as DART. It becomes profitable not only in terms of financial means to investors, but also to the forward movement of sustainable developments, and to every individual who has the fundamental right to clean and safe drinking water.

The device according to a preferred embodiment of the present invention is a solar-powered, mobile, inflatable filtration unit titled a sWell. Its ability to float and its size also allows it to be used as a temporary raft or shelter structure. The form and functions of these free-roaming modules are analogous in part, to the structure and utilities of cellular eukaryotes. These units are to act as water storage tanks and filtration devices in rivers, lakes and flooded areas, both in times of flood and within homeostatic environments. sWell has the potential to be used at both a national and adaptable international scale for crisis situations where there is a need for drinking water.

According to one aspect of the present invention there is provided a portable filtration device for filtering water from a body of water, the device comprising:

an inflatable floatation chamber arranged to support the device to float on the body of water;

a filtration housing arranged to be suspended from the floating chamber in the body of water;

the filtration housing having an inlet, an outlet, and a filtration medium arranged to filter water passing therethrough from the inlet to the outlet;

the inlet being arranged for communication with the body of water; and the outlet being arranged for communication with a filtered water reservoir.

The inflatable floatation chamber is preferably arranged to be collapsible radially inwardly about the filtration housing.

The filtered water reservoir may be integrally supported below the floatation chamber in communication with the outlet of the filtration housing.

The filtered water reservoir is preferably suspended below the floatation chamber. In this instance, the filtered water reservoir may taper downwardly and inwardly from a periphery of the floatation chamber.

The reservoir preferably surrounds the filtration housing with the inlet of the filtration housing being located at a bottom end of the device.

The filtration housing may be laterally centered with respect to the floatation chamber and the water reservoir.

The water reservoir and the floatation chamber are preferably separated only by a sealed membrane.

The filtration housing may comprise an upright column locating the inlet at a bottom end thereof and the outlet at a top end thereof in communication with a surrounding water reservoir and spaced below the floatation chamber.

There may be provided a primary pump arranged to pump water from the body of water through the filtration housing and into the water reservoir.

The primary pump preferably communicates with the inlet of the filtration housing.

There may be provided a one way valve in communication with the outlet of the filtration housing to permit filtered water to only be dispensed from the device.

There may be provided a secondary pump arranged to pump filtered water from the reservoir to a dispensing hose.

The dispensing hose may comprise a flexible hose supported retractably within a respective housing.

Preferably there is provided at least one solar panel supported on a top side of the floatation chamber to provide power to the pump. The solar panel is preferably foldable for storage when deflating the floatation chamber.

When the filtration housing includes a pump and a battery associated therewith, preferably the filtration housing, the pump and the battery are accessible through a top side of the floatation chamber through an access panel.

There may be provided a pump in association with the filtration housing which is operable responsive to water level in the reservoir being below a prescribed level.

When there is provided a support frame supporting the floatation chamber in relation to the filtration housing, the support frame is preferably comprised of inflatable support members.

The inflatable floatation chamber may be arranged to be inflated by an integral rapid inflation mechanism.

There may be provided a plurality of different filtration media arranged to be supported within the filtration housing between the inlet and the outlet, the different filtration media being interchangeable with one another.

The floatation chamber may include a top wall which tapers downwardly and outwardly from a center thereof.

The top wall of the floatation chamber is preferably arranged to span generally horizontally and support persons thereon.

The floatation chamber may include a plurality of anchor points integrally formed on an exterior side thereof.

There may be provided a submersible motor suspended below the floatation chamber in the body of water which is arranged to propel the device across the body of water.

One embodiment of the invention will now be described in conjunction with the accompanying drawings in which:

BRIEF DESCRIPTION OF THE DRAWINGS

FIG. 3 is a top plan view of the device.

FIG. 4 is a perspective view of the device in a deflated position.

FIG. 5, FIG. 6, FIG. 7 and FIG. 8 are respective top, bottom, side and perspective views of the inflated device.

In the drawings like characters of reference indicate corresponding parts in the different figures.

DETAILED DESCRIPTION

Figure 1:
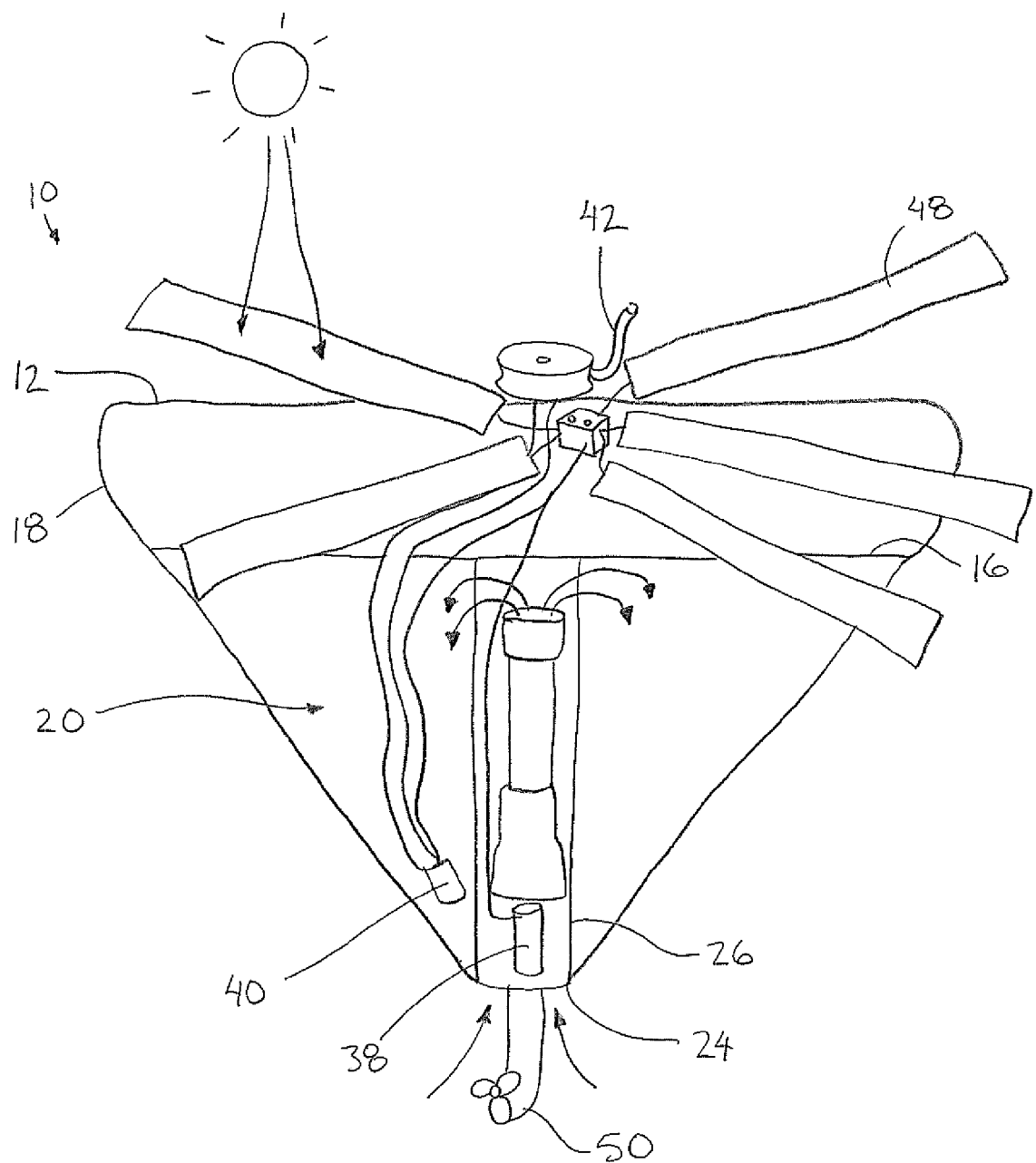
FIG. 1 is a schematic view of the various components of the portable filtration device.
Figure 2:
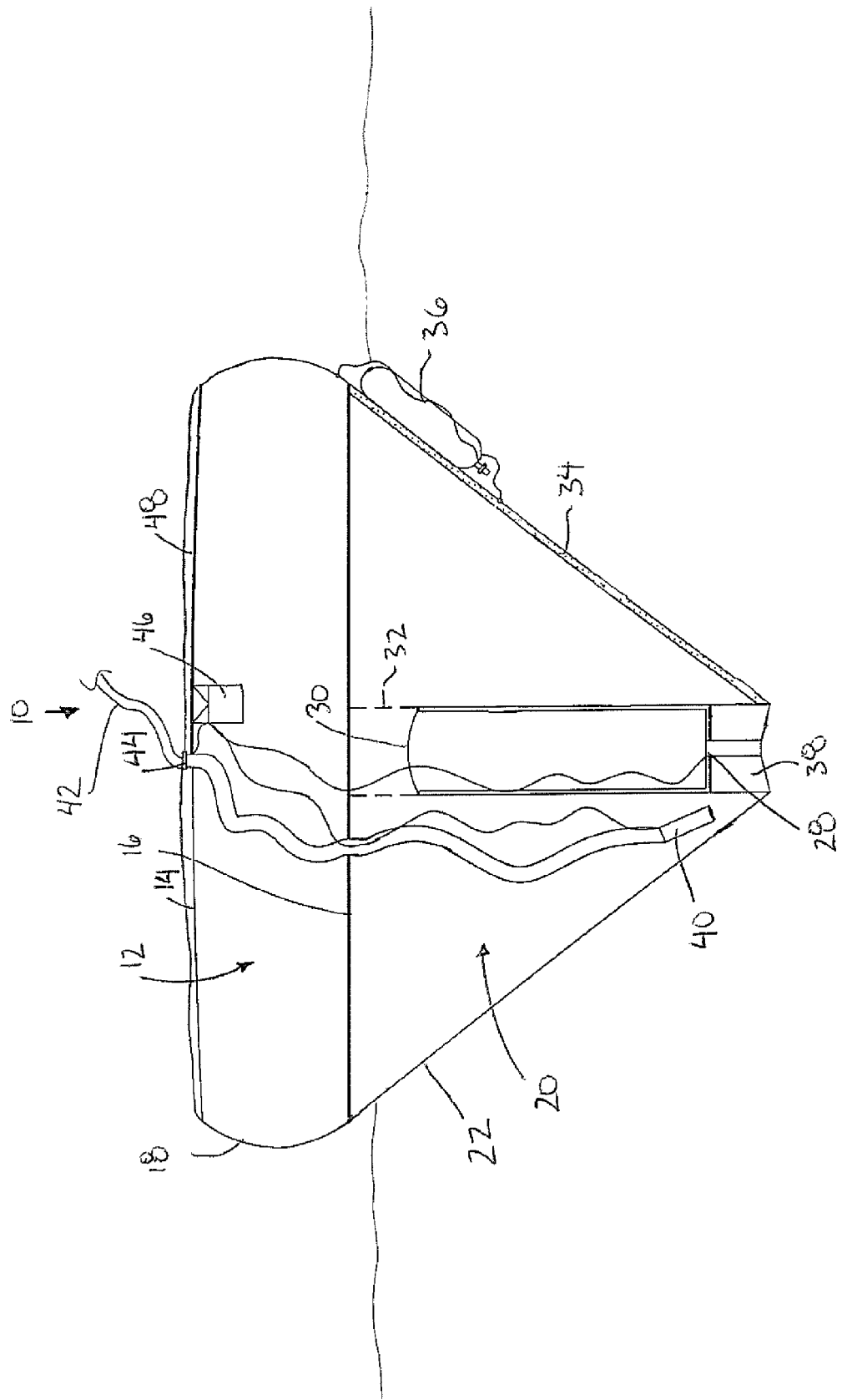
FIG. 2 is a partly sectional elevational schematic view of the device.
Figure 9:
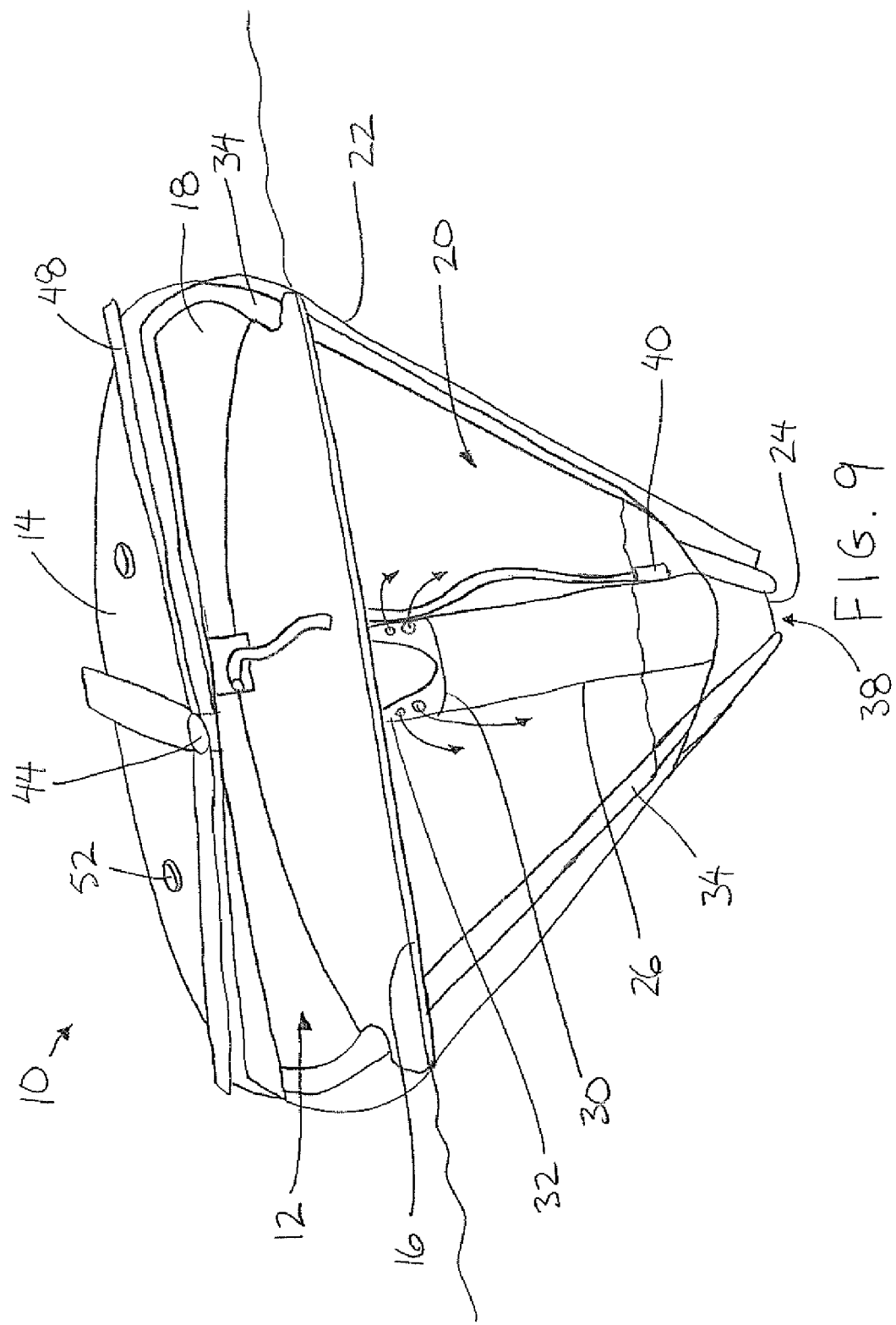
FIG. 9 is a partly sectional perspective view of the device.
Figure 13:
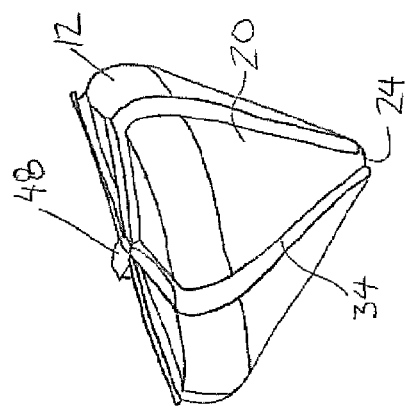
FIG. 13 is a perspective view of the outer skin covering the device.
Figure 12:
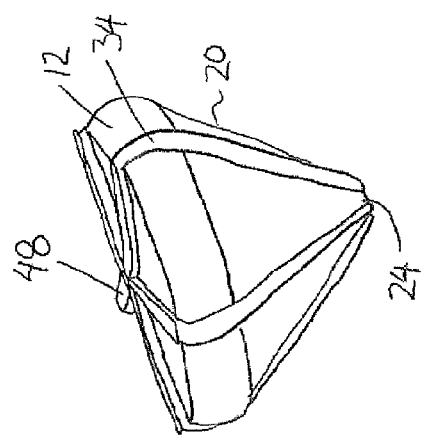
FIG. 12 is a perspective view of the filtered water reservoir supported below the floatation chamber.
Figure 11:
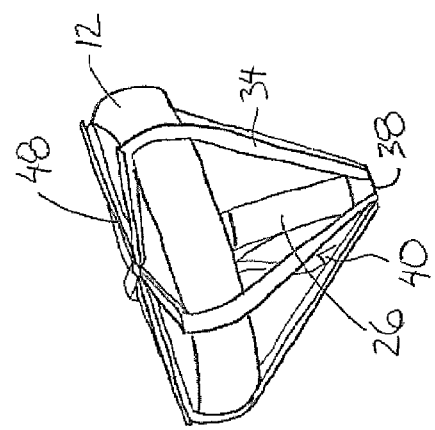
FIG. 11 is a perspective view of the floatation chamber and the inflatable support frame.
Figure 10:
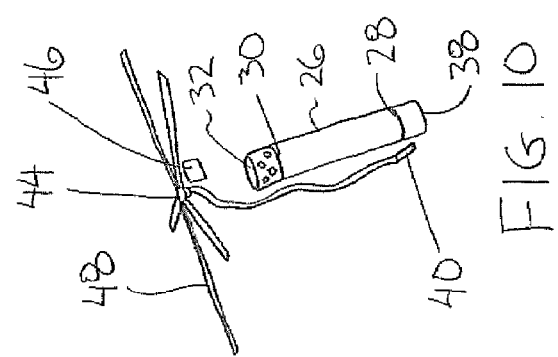
FIG. 10 is a perspective view of the solar panels supported above the filtration housing and the dispensing pump of the device.

Referring to the accompanying figures there is illustrated a portable flirtation device generally indicated by reference numeral 10. The device 10 is particularly suited for providing a device arranged to filter polluted water in remote locations, typically on a temporary basis. The device can be expanded to an in use position and subsequently collapsed into a storage or transport position using flexible materials and inflatable support structures.

The device 10 generally includes a floatation chamber 12 which is circular when viewed in plan view so as to include a circular top wall 14 and a circular bottom wall 16. A generally annular peripheral wall 18 defines a generally cylindrical shaped hollow interior which is inflated with air so as to be arranged to be buoyant on the surface of a body of water. The flexible walls expand and collapse as required for use for storage. The general shape of the floatation chamber 12 is arranged to be very broad in relation to the height thereof so as to be stably supported on the surface of the water.

The device further includes a filtered water reservoir 20 arranged to be suspended below the floatation chamber 12. The reservoir 20 is generally conical in shape including a peripheral wall 22 which extends downwardly and inwardly to a bottom apex 24 from the annular peripheral wall 18 of the floatation chamber thereabove. The bottom wall 16 defines the only separation between the reservoir 20 and the floatation chamber 12 thereabove and generally comprises a sealed flexible membrane. The walls of the reservoir are also flexible for collapsibility in storage. The hollow interior of the reservoir defined by the peripheral wall 22 defines the storage area for storing water which has been filtered by a filtration housing 26.

The filtration housing 26 comprises a generally cylindrical shell forming an upright column extending within the interior of the reservoir 20 from the bottom apex 24 thereof which locates the inlet of the filtration housing 26 to a top end locating an outlet of the filtration housing spaced just below the floatation chamber thereabove. A perforated cylindrical collar 32 extends from the top end of the filtration housing to the bottom wall 16 of the floatation chamber which includes perforations therein so as to permit water flowing out of the outlet of the filtration housing to flow through the perforations and into the surrounding reservoir 20. The filtration housing 26 permits a plurality of different types of filtering mediums to be supported interchangeably therein depending upon the required use of the device.

A support frame is provided in the form of a plurality of inflatable members 34 which comprise elongate ribs extending radially outwardly from the center of the top wall of the floatation chamber at circumferentially spaced positions. Each floatation member 34 spans from the center of the floatation chamber to the annular peripheral wall 18 thereof in a radially direction before then extending downward along the peripheral wall 22 of the reservoir 20 while tapering radially inward therewith to the bottom apex 24 where all of the inflatable members 34 are again joined with one another. The inflatable members 34 are arranged to be sufficiently rigid when inflated with air under pressure to provide structural support to maintain the generally relation ship of the upper flotation chamber, the reservoir supported thereabove and the filtration housing which is centrally located within the reservoir such that the reservoir surrounds the filtration housing. A suitable rapid inflation mechanism 36 is integrally supported on the device in communication with the ribs and the upper floatation chamber to rapidly inflate the inflatable members during deployment from the storage position to the in use position as required.

The device is operated by a primary pump 38 which pumps water from the surrounding body of water into the filtration housing and a secondary pump 40 supported within the reservoir which pumps filtered water from the reservoir to a dispensing hose 42 for subsequent use by the user. The primary pump 38 is located at the bottom end of the filtration housing in communication with the inlet thereof to receive water from the body of water at the bottom apex 24 of the device and for subsequently pumping the water upwardly through the filtration housing to overflow from the outlet thereof into the surrounding reservoir 20. The primary pump 38 is operated responsive to a fluid level sensor in the reservoir so that the pump 38 continues to pump water into the reservoir until the reservoir reaches a prescribed fill level.

The secondary pump 40 includes an inlet in communication with the water in the reservoir at the bottom end thereof and pumps the water through a hose upwardly to a central dispensing cap 44 centered in the top wall of the floatation chamber. The dispensing hose 42 comprises a flexible hose which is coupled to the outlet of the secondary pump 40 through the dispensing cap 44 and generally comprises a flexible hose housed within a suitable housing which is arranged to retract the hose therein for storage.

Power is provided to each of the pumps which are electrically operated by a battery 46 charged by solar panels 48. The battery 46 is housed within a compartment within the floatation chamber 12 which is accessible through a suitable panel. The solar panels 48 each comprise an elongate flexible member spanning the top wall 14 of the floatation chamber to extend radially outward from the dispensing cap 44 to the annular peripheral wall 18 of the device. The solar panels are arranged to be of flexible material so as to permit folding thereof during collapsing of the device for storage.

A motor 50 may be provided which is supported adjacent the bottom end of the device and includes a suitable propeller thereon which is arranged to propel movement of the device laterally across the body of water.

The device further includes a plurality of grommets 52 at circumferentially spaced positions about the top wall 14 of the floatation chamber which serve as anchoring points for various tow lines or accessories to be mounted. One such accessory for example includes a ladder attachment 54 which permits users to readily climb onto the top wall of the floatation chamber which then acts as an upper deck arranged to support several persons thereon. Although the top wall is generally horizontal, the top wall preferably has a slight slope which extends downward and outward from the center cap to the annular peripheral wall to assist in runoff of water collected thereon.

In use the device 10 can be deployed by use of the inflation mechanism 36 to rapidly inflate the inflatable members 34 of the supported frame and the floatation chamber 12 so that the floatation chamber can be floated on a body of water with the reservoir and the filtration housing suspended therebelow. Operating the pumps causes water to be drawn in through the bottom apex from a surrounding body of water of polluted water within which the device is suspended. The polluted water is filtered through passage through the filtration housing so that clean filtered water is dispensed from the outlet of the filtration housing into the surrounding reservoir. The secondary pump can then be actuated by the use based on demand of water being dispensed from the dispensing hose 42. Power for the pumps can be collected fro ongoing usage of the pumps for extended period of time. When it is desired to store or transport the device, the inflatable members 34 of the support frame and the upper floatation chamber 12 can be deflated and the solar panels can be folded so that the floatation chamber and the reservoir can be collapsed and folded radially inwardly about the centrally located filtration housing 26. The device can then be stored within an upright narrow container for ease of shipping and storage.

As described herein, the invention generally comprises an inflatable structure with an upper floatation chamber suspending a filtration system, housing a purified water ballast reservoir below it. Skin on the device comprises a waterproof canvas like material, similar to those used in inflatable boats or recreational water apparatuses. A membranous seal separates the air chamber from the water chamber, as well as the one way valve of the outtake hose. Structural air ribs provide support to the unit, the shape of the filled water ballast provides stability when in water to prevent tipping. Inflatable ballast has a slight 2% slope for water runoff.

The device 10 includes an outer skin referred to as a sWell skin, comprising therma-bonded polyurethane/Duotex. The total weight of device at full capacity is approximately 2100 kg in the illustrated embodiment. Considering 1 L of water=1 Kg, the device therefore holds roughly 2000 L of water with a holding tank which is 2 cubic meters. The pumps and filters are arranged to reach full capacity of the device in approximately 12 hrs at a rate of 56 Gal/hr. Also in the preferred embodiment, the solar panels generate 125 watts and the solar battery life is 29.5 hrs. As an average household uses 375 L of water a day, one filter cycle=5 days of full water supply.

In preferred embodiments, the device 10 has the following features:
- Unit inflates by a fuel cylinder with firing head contraption, or chemical pack similar to those used in inflatable boats, air levels maintained by manual hand pump.
- Upper flotation pocket also double as a raft-structure, in times of flood or complete inundation of water, where a flotation device is required.
- Possible small floating platform with rope ladder allows for easy access.
- Solar panels are those of the variety that are thin, flexible and waterproof, and lie on top of unit, exposed to the sun.
- Dual intake-outtake pumps and hoses are operated by solar polar and battery. Battery is housed within the air pocket. Submersible cables attach energy source to pumps.
- A cylinder-type structure or holding canister houses the filter mechanism or filter membrane. These filters can be specific to location/situation and corresponding water borne diseases or parasites (e-coli, cholera, dysentery etc) chemicals (such as arsenic) or salt.
- The filtration cylinder, battery, hoses, cables and control panel can be accessed for replacement or maintenance through a rubberized, zippered compartment or opening in the inflatable skin.
- Contaminated water enters at bottom of unit through intake pump, flows through filter mechanism, spills through water holes, thus filling the water ballast. Signaling mechanism, like that used in a toilet, controls the start and stop of the filtering water. Clean water is accessible through the top of the structure via the outtake pump and hose that runs through the inflatable pocket and out the centre of the unit closed with a hose cap.
- Possible attachments such as a retractable hose or faucet-like module can attach to the hose-cap depending on the unit's application.
- Grommet rings on top sides of sWell skin, allow the unit to be anchored, tied to a boat tow, dock, or another anchoring structure of choice.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A portable filtration device for filtering water from a body of water, the device comprising:

an inflatable floatation chamber arranged to support the device to float on the body of water;

a filtration housing supported below the floatation chamber so as to be arranged to be suspended integrally with the floatation chamber in the body of water;

a filtered water reservoir supported below the inflatable floatation chamber so as to be arranged to be suspended integrally with the floatation chamber in the body of water;

the filtration housing having an inlet, an outlet, and a filtration medium arranged to filter water passing therethrough from the inlet to the outlet;

the inlet of the filtration housing being arranged for communication with the body of water;

the outlet of the filtration housing being in communication with the filtered water reservoir; and a primary pump supported by the floatation chamber so as to be arranged to be suspended integrally with the floatation chamber in the body of water;

the primary pump being arranged to pump water from the body of water through the filtration housing and into the water reservoir;

the floatation chamber being collapsible from an in-use position in which the floatation chamber is inflated and arranged to provide buoyancy to support the filtration housing and the primary pump and a storage position in which the floatation chamber is collapsed in relation to the in-use position; and the filtered water reservoir being collapsible from an in-use position in which the filtered water reservoir is arranged to receive filtered water therein from the outlet of the filtration housing and a storage position in which the filtered water reservoir is collapsed in relation to the in-use position.

2. The device according to claim 1 wherein the inflatable floatation chamber is arranged to be collapsible radially inwardly about the filtration housing.

3. The device according to claim 1 wherein the filtered water reservoir tapers downwardly and inwardly from a periphery of the floatation chamber.

4. The device according to claim 1 wherein the reservoir surrounds the filtration housing and the inlet of the filtration housing is located at a bottom end of the device.

5. The device according to claim 1 wherein the filtration housing is laterally centered with respect to the floatation chamber and the water reservoir.

6. The device according to claim 1 wherein the primary pump communicates with the inlet of the filtration housing.

7. The device according to claim 1 wherein there is provided a one way valve in communication with the outlet of the filtration housing to permit filtered water to only be dispensed from the device.

8. The device according to claim 1 wherein there is provided a secondary pump arranged to pump filtered water from the reservoir to a dispensing hose.

9. The device according to claim 1 wherein there is provided at least one solar panel supported on a top side of the floatation chamber to provide power to the pump, said at least one solar panel being foldable for storage when deflating the floatation chamber.

10. The device according to claim 1 wherein there is provided a battery associated with the primary pump and wherein the filtration housing, the pump and the battery are accessible through a top side of the floatation chamber through an access panel.

11. The device according to claim 1 wherein the primary pump is operable responsive to water level in the reservoir being below a prescribed level.

12. The device according to claim 1 wherein there is provided a support frame supporting the floatation chamber in relation to the filtration housing in which the support frame is comprised of inflatable support members.

13. The device according to claim 1 wherein the floatation chamber includes a top wall which tapers downwardly and outwardly from a center thereof.

14. The device according to claim 1 wherein the floatation chamber includes a top wall arranged to span generally horizontally and support persons thereon.

15. The device according to claim 1 wherein there is provided a submersible motor arranged to be suspended below the floatation chamber in the body of water and arranged to propel the device across the body of water.

16. A portable filtration device for filtering water from a body of water, the device comprising:

an inflatable floatation chamber arranged to support the device to float on the body of water;

a filtration housing supported below the floatation chamber so as to be arranged to be suspended from the floating chamber in the body of water;

a filtered water reservoir supported below the floatation chamber so as to be arranged to be suspended from the floatation chamber in the body of water;

the filtration housing having an inlet, an outlet, and a filtration medium arranged to filter water passing therethrough from the inlet to the outlet;

the inlet being arranged for communication with the body of water; and the outlet being arranged for communication with the filtered water reservoir;

the water reservoir and the floatation chamber being separated only by a sealed membrane.

17. A portable filtration device for filtering water from a body of water, the device comprising:

an inflatable floatation chamber arranged to support the device to float on the body of water;

a filtration housing supported below the floatation chamber so as to be arranged to be suspended from the floating chamber in the body of water;

a filtered water reservoir surrounding the filtration housing and being supported below the floatation chamber so as to be arranged to be suspended from the floatation chamber in the body of water;

the filtration housing having an inlet, an outlet, and a filtration medium arranged to filter water passing therethrough from the inlet to the outlet;

the inlet being arranged for communication with the body of water; and the outlet being arranged for communication with the filtered water reservoir;

the filtration housing comprising an upright column locating the inlet at a bottom end thereof and the outlet at a top end thereof in communication with the filtered water reservoir surrounding the filtration housing spaced below the floatation chamber.

* * * * *